United States Patent [19]
Paulange

[11] 3,789,230
[45] Jan. 29, 1974

[54] WELDING CURRENT GENERATOR HAVING TWO INTERCONNECTED SOURCES

[76] Inventor: Serge Paulange, 12 Route de Vertori, Nantes, France

[22] Filed: Sept. 29, 1972

[21] Appl. No.: 293,393

[30] Foreign Application Priority Data
Oct. 1, 1971  France ........................... 71.36389

[52] U.S. Cl. ........................... 307/1, 307/2, 307/43, 219/131 WR
[51] Int. Cl. ............................................. H02j 3/00
[58] Field of Search ...... 307/1, 2; 219/131 WR, 135

[56] References Cited
UNITED STATES PATENTS

| | | | |
|---|---|---|---|
| 2,873,383 | 2/1959 | Dennis .................................... | 307/1 |
| 3,459,996 | 8/1969 | Adamson et al. ................ | 219/135 X |
| 2,763,771 | 9/1956 | Bichsel ......................... | 219/131 WR |
| 2,734,981 | 2/1956 | Bichsel et al. ................ | 219/131 WR |
| 2,872,879 | 2/1959 | Vierling .............................. | 307/2 X |

FOREIGN PATENTS OR APPLICATIONS

| | | | |
|---|---|---|---|
| 26,171 | 11/1965 | Japan .................................. | 219/135 |

*Primary Examiner*—William M. Shoop, Jr.

[57] ABSTRACT

Device adapted to provide welding current to automatic arc welding apparatus having a non-fusible electrode. The device comprises a first single-phase current source and a second three-phase current source having means associated with each source for controlling the strength of the current fed by the source. A first rectifier arrangement is connected to the three-phase source for rectifying the current fed by such source and a second rectifying arrangement including a periodic interrupter is connected to the output of the single-phase source for providing a pulsed current. The output of the first and second rectifier arrangements are connected in parallel to the welding electrodes so as to permit superposition of the current fed by the first and second sources, and a switch is provided for short-circuiting the second rectifier arrangement for providing, when the switch is open, a pulsed current superposed on a direct current and, when the switch is closed, an alternating current superposed on the direct current.

7 Claims, 12 Drawing Figures

WELDING CURRENT GENERATOR HAVING TWO INTERCONNECTED SOURCES

The present invention relates to an apparatus for automatic arc welding using non-fusible electrodes, and more particularly to a welding apparatus operating in accordance with the TIG welding process. More precisely, the invention relates to generators adapted to produce a pulsed welding current having various characteristics depending upon the operation it is desired to perform.

It is known that pulsed welding currents give good results. In fact, during the peaks of the current, there is deep penetration of the weld and this, without appreciable increase of the temperature of the metal, in the vicinity of the weld. Furthermore, it permits the welding head to be located in any position without flowing of the liquid metal under gravity. It also improves the extraction of gas. The above known qualities are particularly useful when the welding operation is completely automatic.

The above-mentioned current pulses may be accompanied by step-by-step slave motions, either of the metal thread (that is the unwinding of the thread if it is wound on reels), or of the electrode along its axis, or of the welding head supporting the electrode and the metal thread (movement parallel to the weld seam). The quality of the current pulses and the facility of varying their characteristics hence become more and more necessary. The object of the present invention concerns an apparatus for producing welding currents without taking into consideration the possible relations with the other parameters concerning the electrode or eventually the metal thread. Until now, the type of current desired has been obtained, with a certain approximation, by adapting or transforming or changing the generator provided for a series of very limited operations. Depending on what was required, for example, a uniform D.C. current, an alternating current, or a pulsed current, different generators were used. The number of possibilities was limited by the current sources available. The use of different generators also implied additional operations.

On the other hand, for certain operations, it is necessary to obtain a pulsed current waveform whose leading edge, that is the passage from the minimum current strength to its maximum strength, is practically vertical without distortion. The same applies to the trailing edge of these pulses. The peaks (or maximum) of the pulses must also be stable. The above characteristics have been very difficult to obtain until now.

The apparatus, in accordance with the invention, permits to overcome the above-mentioned drawbacks. With a single apparatus hereinafter called a ganerator, there may obtained a pulsed current having leading edges approaching the theoritical characteristics mentioned above, or a D.C. current, an alternating current, a modulated alternating current, or a pulsed current of any period whose peaks have any predetermined shape.

The sharpness of the leading edges of the pulses is obtained by regulating means located on the secondary windings of transformers which make up the current sources and such regulating means are associated with fast acting interrupters (thyristors) providing the pulses, the transformers being contanly saturated.

The apparatus in accordance with the invention may be a controlled rectifier adapted to provide D.C. current or not (but a predetermined current) to an automatic welding station.

The means put into operation for obtaining such a result are obtained, mainly, by the combination of two secondary current generators, the first one being a single-phase generator and the second one a three-phase generator which are hereinafter called sources to prevent any confusion with the generator which results from their combination in a single apparatus. These two sources consist of the secondary windings of the transformers. They together feed the welding electrode. In other words, their current strengths are superposed at any moment. Other secondary devices or semi-conductors are associated with these sources.

The invention will now be disclosed, by way of example, with reference to a preferred embodiment thereof and to the accompanying drawings in which.

Figure 2:
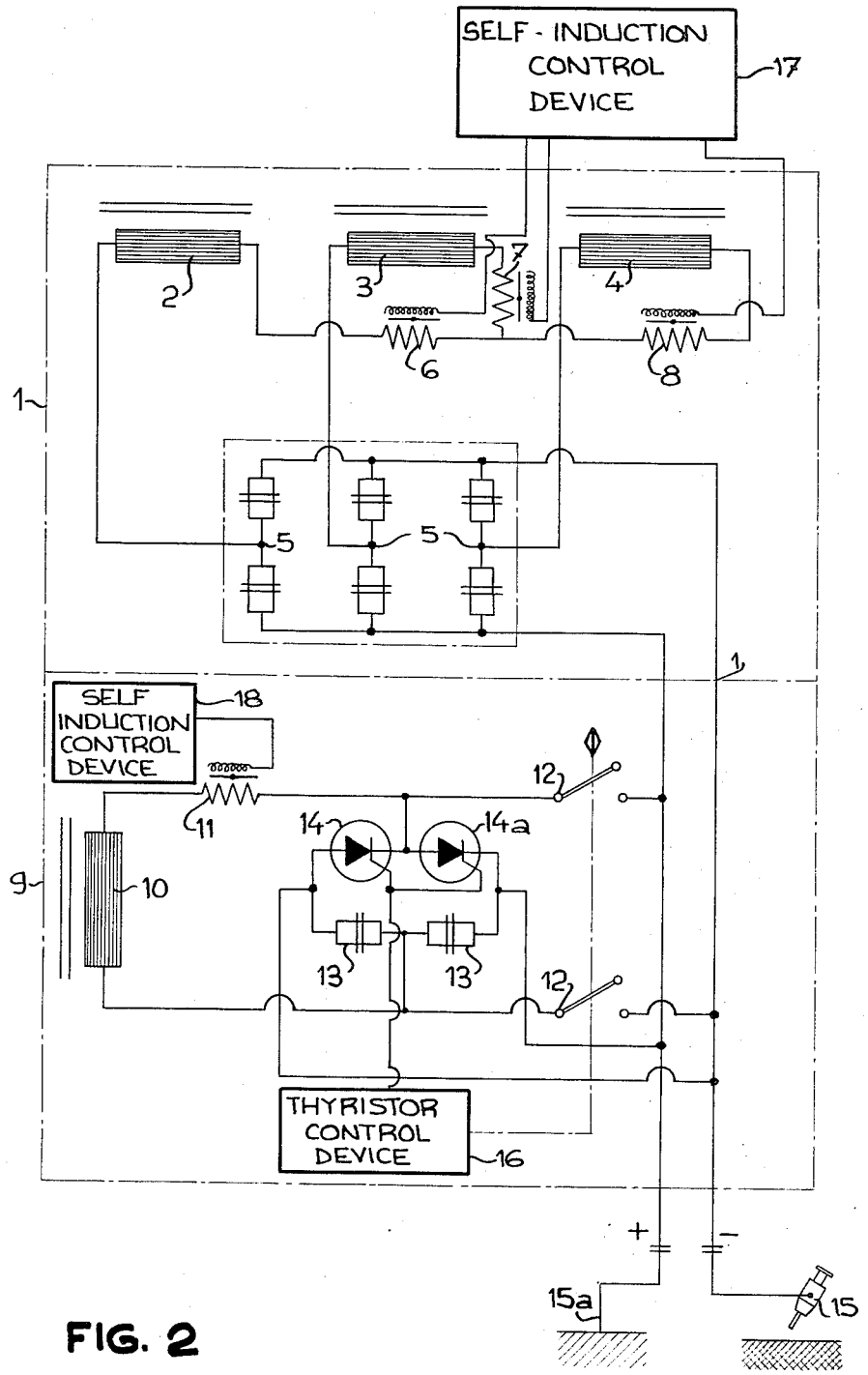
FIG. 2 illustrates a schematic diagram of the apparatus in accordance with the invention.

The two current sources mounted in a same apparatus and constituting the generator in accordance with the invention are combined in fashion which may be varied depending on the type of welding current desired. The first one is a source 1 of three-phase alternating current consisting of the secondary windings 2, 3, 4 of a transformer connected in a delta or star fashion as illustrated in FIG. 2. The rectifier arrangement 5 is permanently connected to the output of the current source. Such current source is regulated by three saturable self-inductors (or inductances) 6, 7, 8 controlled from a control device for example, by appropriate means (such as potentiometers). The other source is a single-phase source 9 consisting of the secondary winding 10 of a transformer. Its current is regulated by a saturable self-inductor 11 which may also be controlled from a distance by a control device. When the switch 12 is closed, the source 9 may feed an alternating current directly to the circuit of the electrode 15, in parallel with the source 1. When switch 12 is opened, the source 10 feeds a rectifier unit 13 through periodic interrupters 14 and 14a. Preferably, these periodic interrupters are electronic components consisting of one or plural thyristors such as illustrated by references 14 and 14a which are opened and closed with a predetermined period P under the control of a control device 16 coupled to switch 12. The two sources 1 and 9 are connected in parallel to the welding electrode 15. The other conductor 15a is connected to ground.

To sum up the above, the source 1 is always rectified, the source 9 may be rectified or not depending on the position of the switch 12. Such source 9 may produce a pulsed current due to the periodical interruptions of the thyristors 14 and 14a. The pulses, rectified by rectifier unit 13, may be modulated by the control of the saturable self-inductor 11. In a general way the saturable self-inductors 6, 7, 8 and 11 permit to obtain a controlled current and eventually an oscillating current due to a control device illustrated by block diagram 17 for the self-inductors 6, 7 and 8, and block diagram 18 for the self-inductor 11. Such control devices may provide repeated sequences of pulses which may be fed at will to the self-inductors. A suitable example of control device may be a rotary programmer.

It will be noted that the control is not done upon the primary of the transformers but on their secondary. The primary windings are always saturated. In the case of pulsed current, the thyristors the rapidity of which is known, may instaneously feed the desired current without any delay or distortion. This explains the sharpness of the wave fronts illustrated in FIG. 1. The wave front F, that is the segment C.D. illustrating the passage of the current from its minimum value A to its maximum value B is practically vertical without deformations in C and D. It is the same in E and G and this whatever may be the period P of the pulses. The peaks (or maximum) of such current pulses is also very stable. It must be noted that, if it is desired to modify the shape of the current, this may be done by the supplementary control provided by the self-inductors.

Figure 3:
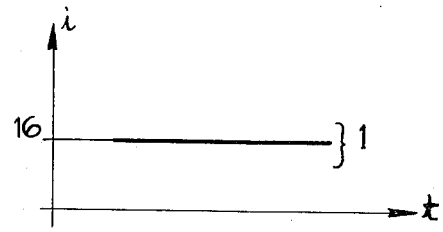
FIG. 3 illustrates the rectified current provided by the three-phase source.
Figure 4:
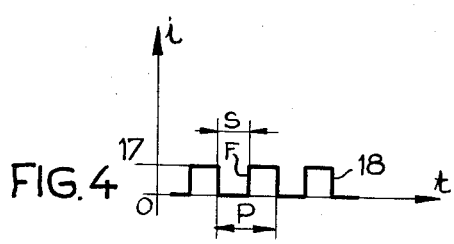
FIG. 4 illustrates a pulsed current provided by the single-phase source using thyristors.
Figure 5:
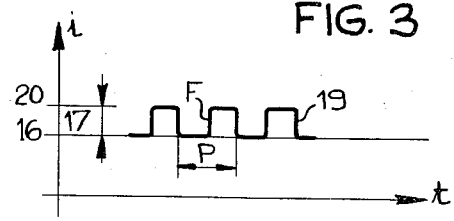
FIG. 5 illustrates the current resulting from the superposition of the currents of FIGS. 3 and 4.

In accordance with a first realization of the invention, the three-phase source 1 is rectified at a current strength 16 (FIG. 3); the single-phase source 9 is first rectified at a value 17, the switch 12 being open (FIG. 4). The current is regularly interrupted during a predetermined time interval S, every P second, by means of thyristors 14 and 14a which instaneously permit the current having strength 17 obtained by the self-inductor 11 to flow. The current fed by source 9 is illustrated by wave form 18. The superposition of these two sources in parallel causes a resulting current having the form 19 as illustrated in FIGI. %. The peaks Or maximum) 20 of the current have a value equal to the sum of the current strengths 16 and 17. The maximum value is the one delivered by the three-phase source after having been rectified (that is 16). It will be noted that, in this case, the electrode is always fed with the same polarity (that is of a positive value equal to 16).

Figure 6:
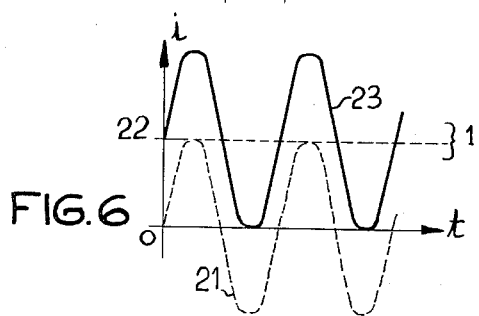
FIG. 6 illustrates an example of an alternating current superposed on the three-phase rectified current.
Figure 7:
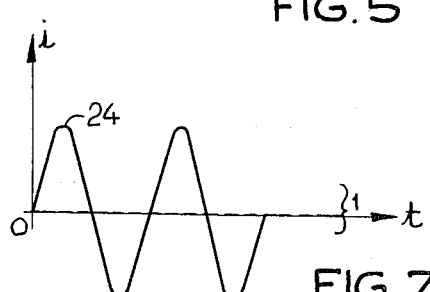
FIG. 7 illustrates the current of FIG. 6 wherein the three-phase rectified current is null.

In accordance with another realization of the invention, the rectifier arrangement of source 9 is by-passed by switch 12. The alternating current 21 is regulated in amplitude by saturable self inductor 11. The other three-phase source 1 is rectified to the value 22. There may be obtained a resulting alternating current 23 whose period is the one of the source 9 (see FIG. 6). FIG. 7 illustrates a resulting current 24 which is identical to the one of the source 9 when the value of the output current of the source 1 is null. The polarity of the current then changes at each oscillation. This arrangement may be used, for example, with light metals.

Figure 8:
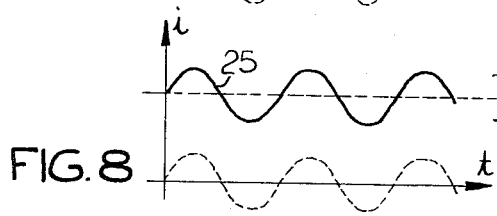
FIGS. 8 and 9 illustrate other types of current.
Figure 9:
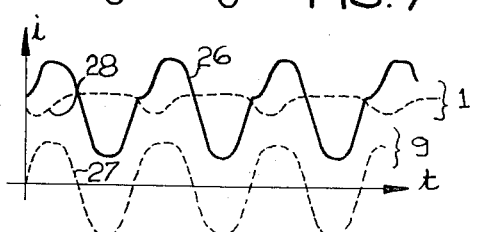

FIG. 8 illustrates another type of resulting current 25 having the same polarity and the same residual value which is very important. FIG. 9 illustrates the wave form 26 obtained with the single-phase source 9 feeding an alternating current 27 and the source 1 feeding a current which is rectified and slightly pulsed as illustrated by reference 28.

Figure 10:
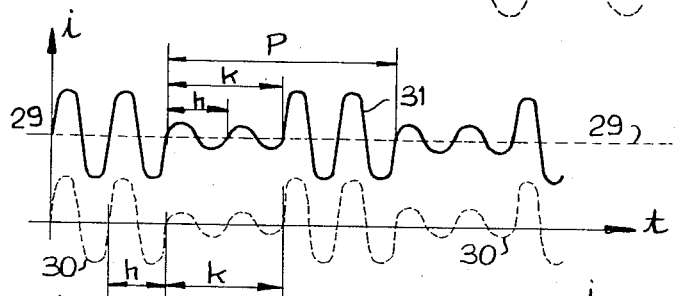
FIG. 10 illustrates an alternating current with periodical modulations superposed on a rectified D.C. current.
Figure 11:
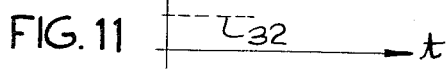
FIG. 11 illustrates the superposition of the current provided by two D.C. sources.

In accordance with another realization of the invention (FIG. 10) there is fed by the three-phase source 1 a rectified current 29 of constant value. The source 9 feeds an alternating current 30 of period $h$. At regular time intervals (P seconds) the alternating current 30 is modulated by damping its oscillations during a short time interval $k$, by means of the control fed to the saturable self-inductor 11. There is thus obtained a pulsed current of period $h$ as illustrated by reference 31 modulated at regular time intervals P.

Figure 1:
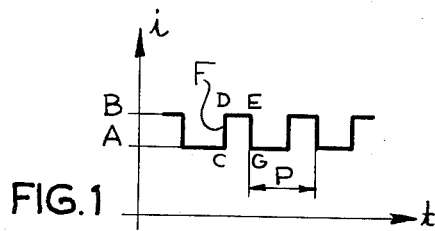
FIG. 1 illustrates a theoritical representation of the desired pulsed current $i$ as a function of the time $t$.
Figure 12:
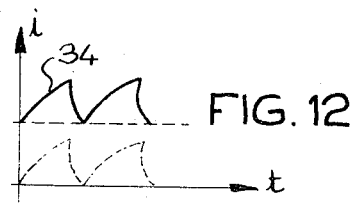
FIG. 12 illustrates a pulsed current whose peaks have a predetermined form.

With the apparatus in accordance with the invention, there may also be fed a continuous welding current having a high strength 33 (superposition of rectified currents 31 and 32 originating from the two sources as shown in FIG. 1). The square waves 34 of the pulsed current may also be deformed as illustrated in FIG. 12 by the combination of the control of the periodical closure of the thyristors of the single-phase source 9 with the control of the saturable self-inductor 11 of the same source, or with the control of the self-inductors 6, 7 and 8 of the three-phase source.

The combination of all the devices required for each of the sources 1 and 9, as illustrated in FIG. 2, is enclosed in a single housing called generator.

It is to be understood that the present invention is not limited to the above disclosed realizations. On the contrary, the invention embodies all possible variations covered by the claims. Indeed, all the current combinations which may be desired from the ones disclosed above, by way of examples, are possible with the apparatus disclosed. The control of the intensity of the current (pulsed or not) may also be done by other means than the saturable self-inductors (or inductances) above disclosed provided that such means permit a control of the characteristics of the current when it is pulsed (period, maximum value, etc.). Also, the rectifiers may also consist of any elements which may be used to that effect.

The apparatus, in accordance with the invention, is used in automatic welding current generators using non-fusible electrodes. It may also be used, in certain conditions compatible with the possibilities of operation, as pulsed welding current generators for fusible electrodes.

I claim:

1. Device adapted to provide welding current to automatic arc welding apparatus comprising a first single-phase current source and a second three-phase current source, means associated with each source for controlling the strength of the current fed by each source, a first rectifier arrangement connected to said three-phase source for rectifying the current fed by said three-phase source, a second rectifier arrangement including periodic interrupters connected to the output of said single-phase source for providing a pulsed current, whereing said periodic interrupters being thyristors permitting to obtain current pulses at predetermined time intervals, means for connecting the output of said first and second rectifier arrangements in parallel to the welding electrode so as to permit superposition of the current fed by said first and second sources, and a switch for short-circuiting said second rectifier arrangement for providing, when the switch is open, a pulsed current superposed on a direct current and, when the switch is closed, an alternating current superposed on a direct current.

2. Device as defined in claim 1, wherein the means for controlling the strength of the current sources consist of saturable self-inductors connected one to each phase of the source and controlled by a control device for each source.

3. Device as defined in claim 3, wherein said control device includes means for regulating the amplitude of the current and means for varying such amplitude in a periodic manner, each means acting separately or in combination.

4. Device as defined in claim 4, wherein said means for varying the amplitude of the current in a periodic manner is a rotary programmer providing pulses or periodic modulations of the current.

5. A device as defined in claim 4, wherein said first and second current sources are transformers the primary of which is saturated whereby the control of the strength of the current or of the periodic interrupters is not influenced by the transformers.

6. Device as defined in claim 1, wherein the operation of the switch is coordinated with the operation of the periodic interrupter so as to obtain various current combinations by superposition of the single-phase current rectified or not with the rectified three-phase current modulated or not.

7. Device as defined in claim 3, wherein said first and second sources and their associated elements are located in a signle housing and wherein said control device includes first means for controlling the strength of the current of each of the sources, second means for controlling the time and the periodicity of closure of the thyristors, third means for controlling the cyclic modulations of the saturable self-inductors, and a fourth means for opening and closing the switch associated with the single-phase source.

* * * * *